United States Patent Office 2,929,830
Patented Mar. 22, 1960

2,929,830
HYDROLYSIS OF ORGANOFLUOROSILANES

Hans Kunowski, Hannover, Germany, assignor to Kali-Chemie A.G., Hannover, Germany, a firm of Germany No Drawing. Application July 11, 1957
Serial No. 671,133

Claims priority, application Germany July 21, 1956

1 Claim. (Cl. 260—448.2)

This invention relates to the hydrolysis of organo-fluorosilanes and it has particular relation to the hydrolysis of organo-fluorosilanes by means of aqueous solutions of alkali.

It has been known that while organo-chlorosilanes can be easily saponified or hydrolyzed for example by the action of water, hydrolysis or organo-fluorosilanes, i.e. substitution of hydroxyl for the fluorine atom attached to the silicon atom, requires more severe reaction conditions, e.g. the use of alkali.

This difference in the behavior of organo-chlorosilanes and organo-fluorosilanes has been utilized for the preparation of fluorine-containing siloxanes, by hydrolyzing compounds of the general formula $R_yFSiX_{3-y}$—wherein R stands for an alkyl radical or an aryl radical, X stands for an easily hydrolyzable radical, e.g. chlorine, and $y$ has the value of 1 or 2—by means of water. Such fluorine-containing siloxanes can be used as intermediate products in further reactions, in which the Si–F bond is involved, but they are undesirable in siloxane polymers which are supposed to have a higher stability to chemical agents.

The known processes for hydrolyzing organo-fluorosilanes by means of aqueous alkali are not satisfactory, because in these processes the recovery of siloxanes which are free from fluorine requires the use of relatively high amounts of organic solvents and the yields are relatively low. Other processes, in which the alkaline solution of hydrolysis products is subjected to condensation prior to the hydrolysis, are time-consuming and likewise do not result in satisfactory yields.

It has now been found that siloxane polymers which are practically free from fluorine can be easily obtained by first hydrolyzing organo-fluorosilanes, in a manner known by itself, by means of excess alkali in aqueous solution and then acidifying the hydrolysis product with such an amount of acid that the pH of the acidified hydrolysis product is in the range of 3.0–6.0, preferably 5.0 and 6.0. By proceeding in this manner, siloxane polymers are obtained which easily separate from the solution and are practically free from fluorine. Fluorine is not detectable in these polymers by the known test with zirconium chloride. (See H. v. Zepplin, Zeitschrift fur Angewandte Chemie 63, 1951, 281 and 64, 1952, 223.)

The compounds which can be treated according to the process of the present invention, correspond to the general formula

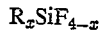

$$R_xSiF_{4-x}$$

wherein R stands for a radical selected from the group consisting of alkyl and aryl radicals and $x$ is an integer having a value of 1–3.

Separation of the siloxane layer from the solution acidified in the above described manner can be effected by letting said solution stand, but it is preferred to extract the acidified hydrolysis product with a suitable organic solvent, e.g. hexane. By distilling off the hexane from the resulting extract under vacuum at temperatures below 30° C., mainly lower polymers are obtained.

According to a preferred modification of the invention, hydrolysis of the organo-fluorosilane is carried out in two steps. In the first of these steps, the organo-fluorosilane is dissolved in an organic solvent, e.g. hexane, and the resulting solution is hydrolyzed with an aqueous solution which contains alkali hydroxide in an amount less than the theoretical amount, e.g. 95% of the theoretical amount, and is added to said solution in the organic solvent. After this first step, in which an aqueous layer and an organic solvent layer are obtained, the layers are separated and in a subsequent second step an aqueous solution of excess alkali hydroxide is added to the organic solvent layer in order to complete hydrolysis. The aqueous layer formed in said first step, which is very slightly acid and can be easily separated from the organic solvent layer, contains in the above mentioned example 95% of the fluorine present in the fluorosilane used as starting material, e.g. in the form of pure $Na_2F_2$, which can be recovered in conventional manner. Said slightly acid reaction is apparently due to the formation of HF in said first step.

In the second step of the hydrolysis, the organic solvent layer, which has been hydrolyzed with excess alkali hydroxide in the above described manner and usually consists of a milky emulsion, is acidified by the addition of acid in such an amount that the pH of the acidified layer is in the range of 3–6, preferably 5–6, whereby the emulsion quickly separates into two layers. The aqueous layer contains the residual amount of fluorine in the form of alkali fluoride, and the alkali metal salt of the acid used.

The hydrolysis product resulting from the above described first step is a siloxane of low degree of polymerization and contains a major proportion of silanol groups and a minor amount, e.g. 5%, of the fluorine originally present, in the form of SiF groups.

In the above described second step, hydrolysis can be carried out with an alkali hydroxide solution of varying concentration and at varying temperatures. Depending on these conditions and also on the ratio R:Si (wherein R stands for an alkyl or aryl radical) a wide range of siloxanes having varying physical properties can be obtained.

The following examples illustrate by way of example some specific embodiments and best ways of carrying out the invention, to which the invention is not limited.

Example 1

92.5 grams (0.75 mol) of $(C_2H_5)_2SiF_2$ are slowly introduced into 400 ml. of aqueous five-normal solution of NaOH (2.0 mols), so that the temperature does not rise above 50° C. Subsequently, five-normal $H_2SO_4$ is gradually added until the solution has a pH value of 5–6, whereby the siloxane separates from the previously milky emulsion within a short period of time as a sharply separated layer of oily liquid. The hydrolysis product is now extracted with 250 ml. of hexane, the hexane solution containing the siloxane is dried with $K_2CO_3$ and the hexane is distilled off under a pressure of 3 mm. Hg up to a temperature of 30° C. The resulting siloxane has a fluorine content which is below the limit detectable with zirconium chloride, i. e. below 0.1%, a viscosity of ~20 centistokes and substantially consists of a mixture of cyclic trisiloxanes with the linear trimer hexaethyltrisiloxane-diol. The yield amounts to ~95%, based on $(C_2H_5)_2SiO$.

If the process is carried out in the manner described above, but with the addition of a total of 105 ml. of five-normal $H_2SO_4$ whereby a pH value of about 2 is attained, after separation and isolation, the siloxane has a fluorine content of 0.3%.

If the process is carried out in the manner described above, but with the addition of a total of 120 ml. of five-normal $H_2SO_4$ (100 ml. being necessary for neutralization) whereby a pH value of about 1 is attained, after separation and isolation, the siloxane has a fluorine content of 0.6%.

Example 2

101 grams (0.75 mol) of $(C_2H_5)_3SiF$ are slowly introduced into 200 ml. of 5-normal aqueous NaOH (1 mol), care being taken to avoid rising of temperature above 30° C. Subsequently, 5-normal $H_2SO_4$ is gradually added until a pH value of 5–6 is obtained. The hydrolysis product is extracted with 200 ml. of diethyl ether, the resulting extract is dried by $K_2CO_3$ and the ether is removed under vacuum. The resulting product contains more than 60% of $(C_2H_5)_3SiOH$ and less than 0.1% of fluorine.

Example 3

1 mol (124.18 grams) of diethyl di-fluorosilane are mixed with 250 ml. of hexane and to the resulting product 1.9 mols (76.0 grams) of sodium hydroxide are added in the form of five-normal aqueous NaOH solution, under vigorous stirring. This charge is stirred at 50° C. for about 1 hour, and then allowed to stand whereby it separates into two layers within a short period of time. The lower, aqueous layer contains about 80 grams of sodium fluoride in 380 ml. of water and has a milky appearance due to the presence of precipitated sodium fluoride. This layer is separated and can be used for the recovery of pure sodium fluoride. To the hexane layer 0.7 mol of NaOH (corresponding to an excess of 30%) are added in the form of a 5-normal aqueous NaOH solution and the mixture is stirred for one hour. It is then diluted with 500 ml. of water and subsequently acidified by the gradual addition of 5-normal aqueous HCl solution until a pH of 5–6 is obtained. Thereby, the siloxane-hexane layer quickly separates from the aqueous layer. The latter contains about 4 grams of sodium fluoride and 35 grams of sodium chloride in 620 ml. of water.

The siloxane-containing hexane layer is now dried by silica gel or another drying agent and the hexane is distilled off under a pressure of 3 mm. Hg up to a temperature of 30° C.

The fluorine content of the siloxane thus obtained is below the limit detectable by the zirconium oxychloride test, i.e. below 0.1%. The siloxane has a viscosity of 115 centistokes at 20° C. and a hydroxyl number of about 12% SiOH-groups, i.e. 0.8 hydroxyl groups for one Si atom. The siloxane yield calculated as $$(C_2H_5)_2SiO_{0.6}(OH)_{0.8}$$

amounts to more than 95% based on the $(C_2H_5)_2SiF_2$ used as starting material.

Example 4

0.6 mol (75 grams) of $(C_2H_5)_2SiF_2$ and 0.4 mol (54.7 grams) of $(C_2H_5)_3SiF$ are dissolved in 250 ml. of hexane. To the resulting solution 1.52 mol of NaOH are added in the form of aqueous five-normal NaOH solution under vigorous stirring. This charge is stirred at 50° C. for one hour. As soon as stirring is discontinued, the milky emulsion separates into two layers within a short period of time. The lower, aqueous layer which is separated as described in the above Example 3, contains 95% of the fluorine present in the fluorosilane starting material, in the form of pure sodium fluoride.

To the siloxane-containing upper hexane layer a further amount of 0.16 mol of NaOH (5% excess) is added in the form of five-normal aqueous sodium hydroxide solution at room temperature and the mixture is stirred for one hour. It is then diluted with 500 ml. of water and acidified by the gradual addition of 0.5 normal aqueous HCl solution until a pH of 6 is obtained. After separation of the aqueous layer, the siloxane-hexane layer is further processed in the manner described in the above Example 3.

The fluorine content of the resulting siloxane is below the limit of 0.1% (which is detectable by the zirconium oxychloride test). It has a viscosity of 37.5 centistokes at 20° C. and a hydroxyl number of about 9% of SiOH groups, i.e. 0.6 hydroxyl groups for one Si atom. The siloxane yield calculated as $$(C_2H_5)_2SiO_{0.7}(OH)_{0.6}$$

amounts to more than 95% based on the ethyl fluorosilane mixture used as starting material.

Example 5

0.8 mol (100 grams) of $(C_2H_5)_2SiF_2$ and 0.2 mol (27.5 grams) and $(C_2H_5)_3SiF$ are dissolved in 250 ml. of hexane and subjected to hydrolysis in the manner described in the above Example 4. By processing the hexane layer a silicone oil is obtained, the fluorine content of which is not detectable by the zirconium oxychloride test and which has a viscosity of 32 centistokes at 20° C. and a hydroxyl number of 10%, i.e. contains 0.7 hydroxyl groups for one Si atom.

Example 6

48 grams (0.5 mol) of $(CH_3)_2SiF_2$ dissolved in 125 ml. of hexane are cooled to −15° C. Under cooling and simultaneous stirring 210 ml. of 5-normal aqueous sodium hydroxide solution (1.05 mol) are gradually added so slowly that the temperature of the reaction mixture does not exceed 0° C. Keeping the temperature in this range is necessary in order to safely prevent premature evaporation of the $(CH_3)_2SiF_2$ from the hexane solution. The addition of sodium hydroxide solution is completed in one hour. Under slow increase of the temperature of the reaction mixture to ordinary room temperature, e.g. 20° C., the reaction mixture is diluted with about 500 ml. of water and the dilute solution is allowed to stand whereby separate layers are formed. However, in order to obtain a clear separation of the layers, the pH must be adjusted to 6, e.g. by the addition of 5-normal sulfuric acid.

The hexane layer containing the dimethyl siloxane is separated from the aqueous layer, subsequently dried with silica gel, and the hexane is distilled off under a pressure of 3 mm. Hg at a temperature not exceeding 30° C. The dimethyl siloxane thus obtained contains fluorine in an amount which is not detectable by the zirconium oxychloride test (i.e. is below 0.1%) and it contains 6.3% of SiOH groups and has a viscosity of 24 centistokes at 20° C. Upon standing for a protracted period of time, water separates from the hydrolysis product, due to further condensation.

Example 7

To 76 grams (0.5 mol) of $(n-C_3H_7)_2SiF_2$ dissolved in 125 mol. of hexane, 210 ml. of 5-normal aqueous sodium hydroxide solution are gradually added under stirring within one-half hour. Thereby the temperature is increased to slightly above 40° C. Stirring of the reaction mixture is continued at this temperature for about 3 hours. Subsequently, the reaction mixture is diluted with about 500 ml. of water. A clear separation of the hexane layer from the aqueous layer is brought about by adjusting the pH of the aqueous layer to about 6 by the addition of 5-normal $H_2SO_4$.

The hexane layer, which contains the di-n-propyl siloxane, is now separated from the aqueous layer and dried with silica gel, and the hexane is distilled off under a pressure of 3 mm. Hg at a temperature not exceeding 30° C. The fluorine content of the di-n-propyl siloxane cannot be detected by zirconium oxychloride test (i.e. is below 0.1%). This di-n-propyl siloxane contains 11% SiOH groups. The yield—based on the amount of the (n-C₃H₇)₂SiF₂ starting material amounts to more than 95%.

*Example 8*

55 grams (0.25 mol) of diphenyldifluorosilane are dissolved in 125 ml. of diethyl ether. To this solution 110 ml. of 5-normal aqueous sodium hydroxide solution (0.55 mol) are gradually added under cooling with ice and vigorous stirring within one-half hour. The reaction mixture is diluted with 500 ml. of ice water and the pH of the aqueous layer formed is adjusted to 5–6 by the addition of 5-normal H₂SO₄.

After separation of the aqueous layer, the ether solution is dried with silica gel and the ether is removed under vacuum. The residue is a slightly yellow colored, crude diphenylsilane diol, which—after recrystallization from ether or hexane—has a melting point of 142° C. The fluorine content of the end product is below the limit detectable with zirconium oxychloride. The yield of purified diphenylsilane diol amounts to more than 80%.

It will be understood from the above that this invention is not limited to the compounds, conditions, solvents, steps, and other details specifically described above and can be carried out with various modifications. For example, NaOH can be substituted by KOH or a mixture of NaOH and KOH. Instead of hexane or diethyl ether, other solvents, which are not miscible with water, can be used, e.g. esters, dipropyl ether, ketones, aliphatic hydrocarbons, benzene, toluene, cyclohexane and others. Mixtures of several organic solvents (which are homogeneously miscible with each other) can also be used. The "short period of time" mentioned in the aboxe examples, is usually in the range of 5 to 10 minutes. Examples of acids which can be used for adjustment of the pH are: Hydrochloric acid, H₃PO₄, acetic acid, oxalic acid and the like. By varying the amount of alkali used in the first and second step, corresponding portions of the alkali fluoride formed are recovered in pure form in the first step. The preferred range of temperature for carrying out hydrolysis according to the invention is indicated in the above examples. In the two-step embodiment of the invention, 20–99% of the alkalihydroxide theoretically necessary for complete hydrolysis, are used in the first step. Finally, in addition to the silicon compounds specifically mentioned above, any other member of the groups defined in the appended claim, can be treated according to the process of this invention. These and other modifications can be made without departing from the scope of the invention defined in the appended claim.

What is claimed is:

A process for preparing organosiloxanes practically free from fluorine, by hdyrolysis of organo-fluorosilanes corresponding to the general formula $$R_xSiF_{4-x}$$

wherein R stands for a radical selected from the group consisting of alkyl and aryl radicals and $x$ is an integer having a value of 1–3, with aqueous alkali hydroxide solution, comprising hydrolyzation of the organo-fluorosilanes in alkaline solution and acidification of the hydrolyzed solution by adding to it acid in an amount resulting in a pH in the range of 3.0–6.0 of the solution, in order to separate the organosiloxane from the solution, said process being carried out in a first step of partially hydrolyzing the organo-fluorosilane in an organic solvent with an aqueous alkali hydroxide solution containing alkali hydroxide in an amount of 20 to 99% of the theoretical amount for complete hydrolysis and mechanically separating the aqueous solution from the organic phase and a second step of continuing hydrolysis in said organic phase with an aqueous solution containing the rest of the theoretical amount of alkali hydroxide and an excess of the same and, after complete hydrolysis, acidifying this hydrolysis mixture to a pH in the range of 3.0–6.0.

References Cited in the file of this patent

UNITED STATES PATENTS

| | | |
|---|---|---|
| 2,405,041 | Mathes et al. | July 30, 1946 |
| 2,600,307 | Lucas et al. | June 10, 1952 |
| 2,715,113 | Gordon | Aug. 9, 1955 |

FOREIGN PATENTS

| | | |
|---|---|---|
| 966,619 | France | Mar. 8, 1950 |

OTHER REFERENCES

Emeleus et al.: "Jr. Chem. Soc." (London), 1944, pp. 454–6.

Thesis by Nelson S. Marans, "Dialkyldifluorosilanes and Trialkylfluorosilanes—Preparation and Properties," The Pennsylvania State College, The Graduate School, Dept. of Chemistry, February 1947, pp. 38–45 and 52–54 (summary also in "Jr. Am. Chem. Soc.," vol. 73 (1951), pp. 5127–30).